(12) United States Patent
Bode

(10) Patent No.: US 7,558,687 B1
(45) Date of Patent: Jul. 7, 2009

(54) METHOD AND APPARATUS FOR DYNAMIC ADJUSTMENT OF A SENSOR SAMPLING RATE

(75) Inventor: Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 595 days.

(21) Appl. No.: 10/932,999

(22) Filed: Sep. 2, 2004

(51) Int. Cl.
*G01N 37/00* (2006.01)
*G06F 11/30* (2006.01)

(52) U.S. Cl. .................. 702/83; 702/182; 702/188; 702/189; 700/14

(58) Field of Classification Search ............ 702/83–88, 702/121–123, 182–189, 81, 82; 340/870.1; 455/403; 348/14.12; 700/14, 306
See application file for complete search history.

(56) References Cited

U.S. PATENT DOCUMENTS

| 5,643,044 | A | 7/1997 | Lund ............................ 451/5 |
| 6,173,207 | B1* | 1/2001 | Eidson ......................... 700/14 |
| 2001/0034222 | A1* | 10/2001 | Roustaei et al. ............. 455/403 |

* cited by examiner

*Primary Examiner*—Eliseo Ramos Feliciano
*Assistant Examiner*—Phuong Huynh
(74) *Attorney, Agent, or Firm*—Williams, Morgan & Amerson

(57) ABSTRACT

The present invention provides a method and apparatus for dynamic adjustment of a sensor sampling rate. The method includes providing a data collection plan indicative of at least one first sampling rate for at least one sensor associated with at least one processing tool, receiving tool trace data from the at least one sensor via a network, and modifying, based on the tool trace data and a bandwidth associated with the network, the data collection plan to indicate at least one second sampling rate different from a corresponding at least one first sampling rate.

24 Claims, 4 Drawing Sheets

METHOD AND APPARATUS FOR DYNAMIC ADJUSTMENT OF A SENSOR SAMPLING RATE

BACKGROUND OF THE INVENTION

1. Field of the Invention

This invention relates generally to the field of semiconductor device manufacturing and, more particularly, to a method and apparatus for dynamic adjustment of a sensor sampling rate.

2. Description of the Related Art

To fabricate a semiconductor device, a wafer is typically provided to numerous processing tools in a predetermined sequence. The processing tools may include photolithography steppers, etch tools, deposition tools, polishing tools, rapid thermal processing tools, implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, advanced process control (APC) systems are often used to coordinate operation of the processing tools.

A conventional APC system includes one or more machine interfaces that are communicatively coupled to equipment interfaces associated with each of the processing tools. The machine and equipment interfaces are typically computers or workstations that are coupled to a network. For example, a plurality of processing tools may be coupled to an Intranet via an associated plurality of equipment interfaces. A machine interface that implements the conventional APC system may also be coupled to the Intranet. In operation, the conventional APC system initiates a control script based upon a manufacturing model, which can be a software program that automatically retrieves the data needed to execute a manufacturing process, and transmits one or more control messages, such as the operating recipe, to the processing tools.

The processing tools may include one or more sensors to collect data associated with operation of the processing tool. For example, an etching tool may include a sensor to monitor the radio frequency power delivered by the etching tool. For another example, a rapid thermal anneal tool may include a thermocouple to monitor a temperature within the tool. The data acquired by the various sensors may be referred to as trace data. The collected tool trace data may then be provided to the APC system, which may use the collected tool trace data for various purposes such as fault detection and/or classification. For example, the tool trace data collected by the thermocouple in the rapid thermal anneal tool may indicate that the temperature within the tool has dropped below a desired threshold, indicating a possible fault.

The network that is used to transmit control messages, tool trace data, and any other information between the APC system and the processing tools has a finite bandwidth. Consequently, it is not generally possible to continuously collect and transmit tool trace data using all the sensors in all the processing tools coupled to the network. For example, an exemplary APC system may be coupled to several processing tools, each of which may have as many as 50 or 60 associated sensors. If all of the sensors continuously attempted to provide tool trace data over the network, the network would become overloaded and unable to transmit the collected tool trace data. Accordingly, the APC system provides a predetermined data collection plan that specifies which sensors may collect tool trace data and a sampling rate associated with each sensor. For example, a sensor may have a sampling rate of about one Hertz.

Although the predetermined data collection plan may be adequate when the processing tools are operating normally, the predetermined data collection plan may limit the ability of the APC system to detect and/or classify faults or other unexpected events associated with the processing tools. For example, tool trace data from a sensor may deviate from an expected value, which may indicate a fault associated with the tool. Thus, it may be desirable to increase the sampling rate of the sensor to provide additional data that may assist in detecting and/or classifying the suspected fault. Moreover, it may also be desirable to decrease the sampling rate of one or more other sensors to provide additional network bandwidth for the high sampling rate sensor. However, conventional APC systems are not able to modify the predetermined data collection plans to respond to changing conditions and/or bandwidths.

The present invention is directed to addressing the effects of one or more of the problems set forth above.

SUMMARY OF THE INVENTION

In one embodiment of the present invention, a method is provided for dynamic adjustment of a sensor sampling rate. The method includes providing a data collection plan indicative of at least one first sampling rate for at least one sensor associated with at least one processing tool, receiving tool trace data from the at least one sensor via a network, and modifying, based on the tool trace data and a bandwidth associated with the network, the data collection plan to indicate at least one second sampling rate different from a corresponding at least one first sampling rate. Embodiments of an apparatus and a system for implementing the method are also provided.

BRIEF DESCRIPTION OF THE DRAWINGS

The invention may be understood by reference to the following description taken in conjunction with the accompanying drawings, in which like reference numerals identify like elements, and in which.

Figure 1:
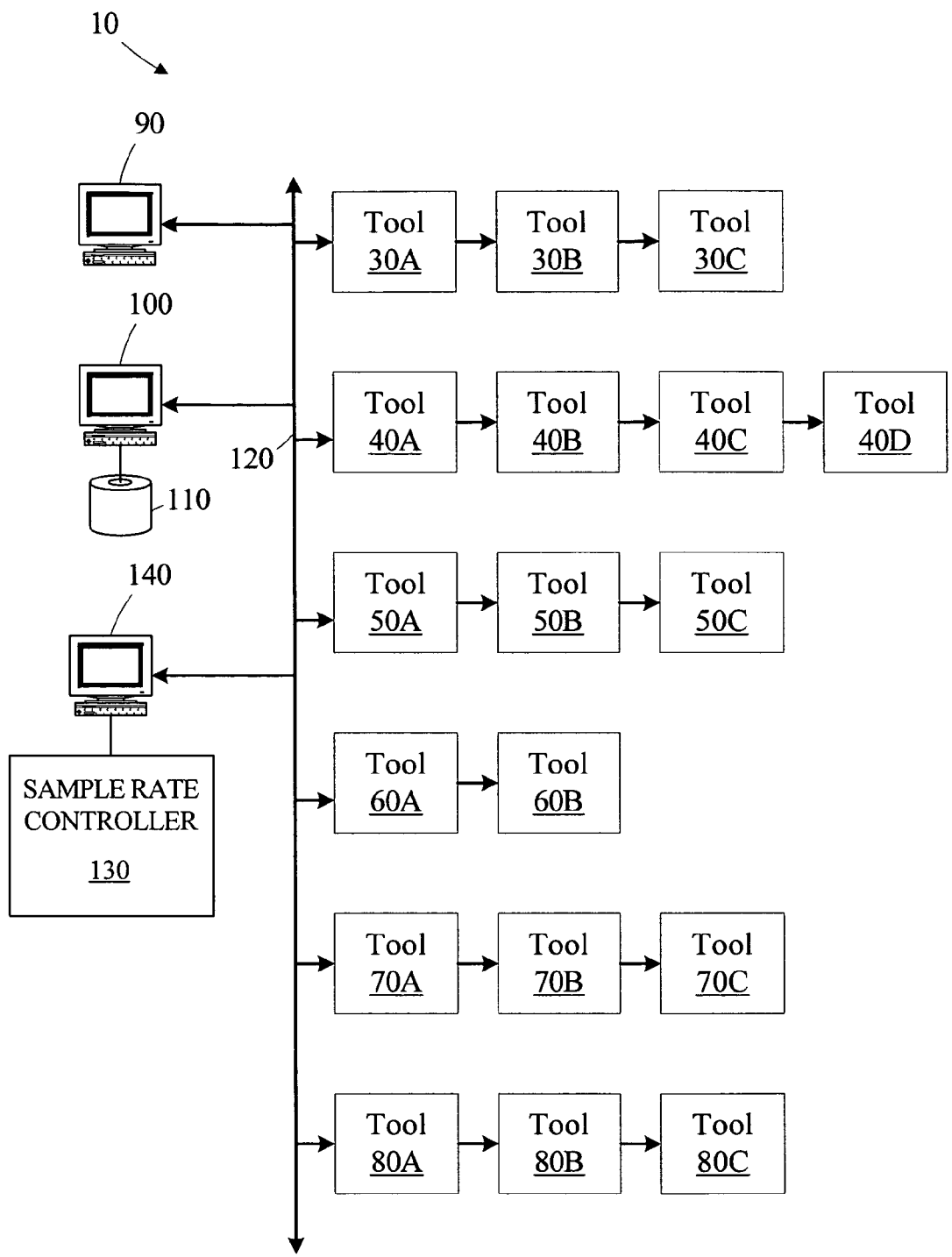
FIG. 1 is a simplified block diagram of a manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 shows a simplified block diagram of an illustrative manufacturing system 10. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif. However, persons of ordinary skill in the art should appreciate that the present invention is not limited to the Catalyst APC system. In alternative embodiments, any desirable information exchange and process control framework may be used without departing from the scope of the present invention.

The manufacturing system 10 includes a plurality of tools 30-80. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, and the like The tools 30-80 are depicted in a rank and file grouping for illustrative purposes only. In an actual implementation, the tools 30-80 may be arranged in any physical order or grouping. As will be discussed in detail below, each tool 30-80 may also include one or more sensors (not shown in FIG. 1).

A manufacturing execution system (MES) server 90 directs high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, and the like. The processing and data storage functions are distributed amongst the different computers or workstations in FIG. 1 to provide general independence and central information storage. However, persons of ordinary skill in the art should appreciate that different numbers of computers and different arrangements may be used without departing from the scope of the instant invention.

A network 120 interconnects various components of the manufacturing system 10, such as the tools 30-80 and the servers 90, 100, allowing them to exchange information. In one embodiment, each of the tools 30-80 is coupled to a computer (not shown) for interfacing with the network 120. Additionally, the connections between the tools 30-80 in a particular grouping are meant to represent connections to the network 120, rather than interconnections between the tools 30-80. In various alternative embodiments, the network 120 may be an Internet, intranet, or any other desirable type of network. Persons of ordinary skill in the art should appreciate that the network 120 may include a variety of routers, hubs, switches, connectors, interfaces, cables, wires, and the like that are not shown in FIG. 1.

The network 120 has an associated bandwidth for data transmission. For example, the network 120 may be able to transmit several hundred megabits of data per second between the tool 30A and the server 90. However, persons of ordinary skill in the art should appreciate that the bandwidth of the network 120 may not be characterized by a single bandwidth and instead may vary depending on the data path that connects components of the network 120. For example, the bandwidth for data transmitted between the tool 30A and the server 90 may be different than the bandwidth for data transmitted between the tool 80A and the server 100. Moreover, although the overall bandwidth of the network 120 may remain approximately constant, the bandwidth available for any particular device coupled to the network 120 may vary depending on how much data is being transmitted over the network 120 by other devices. For example, if the tool 30A is transmitting a large volume of data to the server 90, the bandwidth available for data transmissions between the tool 80A and the server 100 may be reduced.

A sample rate controller 130 is coupled to the network 120. In the illustrated embodiment, the sample rate controller 130 is implemented in a computer 140, which may be coupled to the network 120 in any desirable manner. As will be discussed in more detail below, the sample rate controller 130 can form one or more data collection plans and provide the data collection plans to the tools 30-80. For example, the sample rate controller 130 may form a data collection plan that includes one or more operating recipes for one or more of the processing tools 30-80. The data collection plan may also indicate a sampling rate for each of the sensors (not shown in FIG. 1) associated with the tools 30-80. For example, a data collection plan may indicate that a temperature sensor in the tool 30A should collect data at a sampling rate of one Hertz.

The sample rate controller 130 is configured to receive tool trace data from the sensors associated with the tools 30-80 via the network 120. As will be discussed in detail below, in one embodiment, the sample rate controller 130 may analyze the tool trace data to determine one or more values associated with the tool trace data. The sample rate controller 130 may also determine an expected value associated with the tool trace data and then compare the determined value with the expected value. The sample rate controller 130 is also configured to modify the data collection plan based on the tool trace data and the bandwidth associated with the network 120. As will be discussed in more detail below, in one embodiment, the sample rate controller 130 may modify the data collection plan to change the data sampling rate of one or more of the sensors based on the bandwidth of the network 120 and in response to determining that the value associated with the of trace data is different than the expected value.

The sample rate controller 130 may determine the bandwidth of the network 120 in any desirable manner. In one embodiment, a predetermined estimate of the bandwidth of the network 120 may be provided to the sample rate controller 130. For example, the bandwidth may be constrained to a level below a predetermined inherent limit of the manufacturing system 10 to avoid communications issues that may stem from unduly taxing the communications lines or other devices in the network 120. In another embodiment, the sample rate controller 130 may estimate the bandwidth of the network 120 using data received from the network 120.

Figure 2:
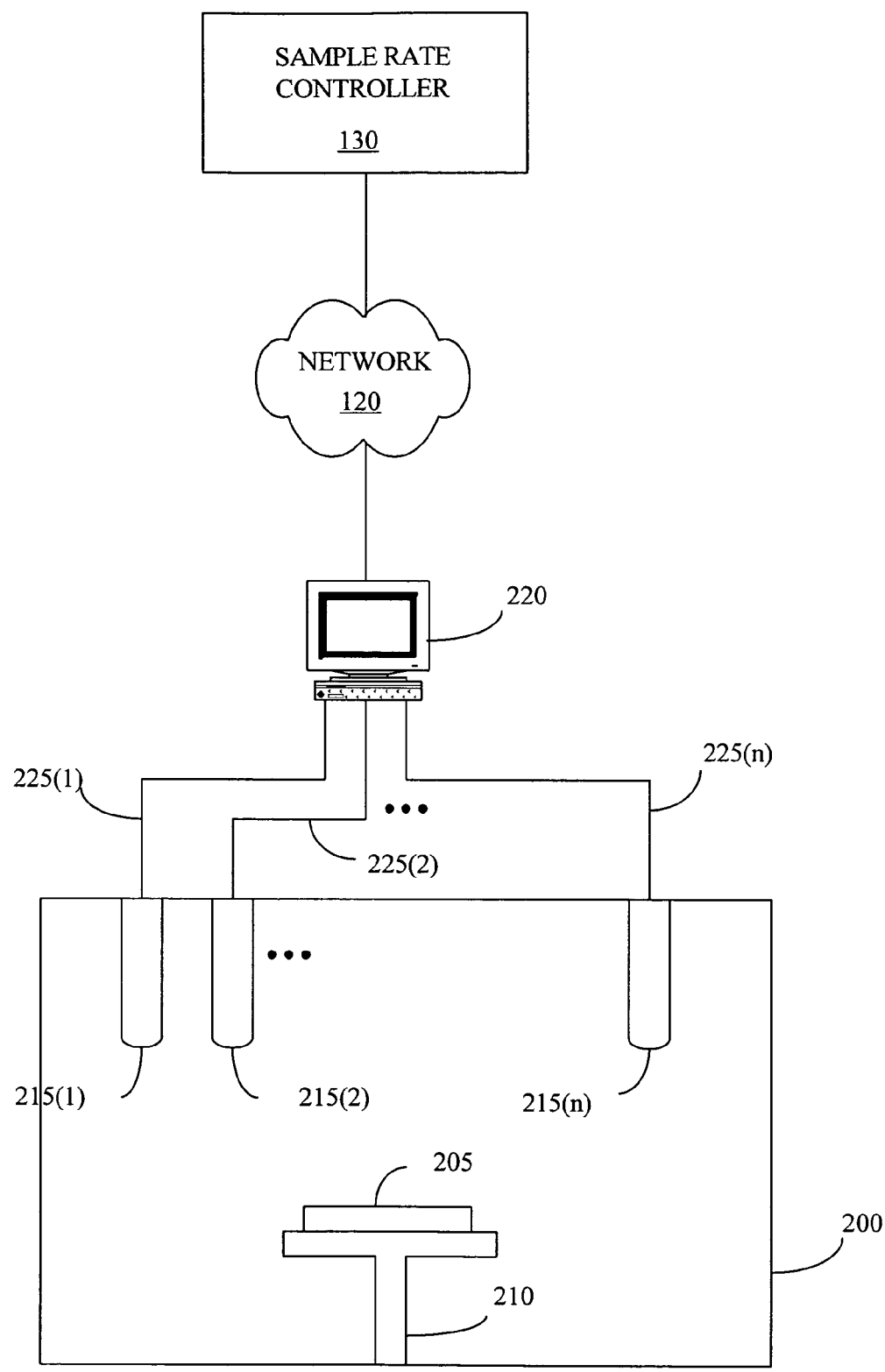
FIG. 2 conceptually illustrates an exemplary embodiment of a processing tool, in accordance with the present invention.

FIG. 2 conceptually illustrates an exemplary embodiment of a processing tool 200. In the illustrated embodiment, the processing tool 200 includes a wafer 205 disposed upon a platform 210. Persons of ordinary skill in the art should appreciate that the processing tool 200 may include other components not shown in FIG. 2. In the interest of clarity, only those components of the processing tool 200 that are relevant to the present invention will be discussed herein.

The processing tool 200 includes a plurality of sensors 215(1-n). The present invention is not limited to any particular type of sensor 215(1-n). In various alternative embodiments, the sensors 215(1-n) may be any desirable type of sensor or any desirable combination of types of sensors. For example, the sensors 215(1-n) may include thermocouples, pressure sensors, gas flow sensors, radiation sensors, acoustic sensors, and the like. Moreover, the present invention is not limited to any particular number of sensors 215(1-n). In alternative embodiments, the processing tool 200 may include more or fewer sensors 215(1-n) than are shown in FIG. 2. For example, the processing tool 200 may include 50 sensors 215(1-n). The sensors 215(1-n) may be integral to the processing tool 200 or they may be add-ons.

The sensors 215(1-n) are coupled to an equipment interface 220, such as a computer, by one or more interfaces 225(1-n). Persons of ordinary skill in the art should appreciate that the one or more interfaces 225(1-n) may include components that are not shown in FIG. 2 such as processing units, data communication ports, routers, switches, hubs, cables, wires, and the like. The equipment interface 220 may be coupled to the network 120 in any desirable manner. As used herein, the bandwidth associated with the network 120 will be understood to include the bandwidth of the network 120, the equipment interface 220, the interfaces 225(1-n), and any other component that may affect the bandwidth available to one or more of the sensors 215(1-n) for transmitting or receiving data over the network 120.

In operation, the sample rate controller 130 provides a data collection plan for the sensors 215(1-n). For example, the sample rate controller 130 may form a data collection plan indicating that the sensors 215(1-n) are to collect data at a nominal sample rate of approximately one Hertz. In one embodiment, the sample rate controller 130 provides the data collection plan to the equipment interface 220, which may then provide a signal indicative of the sample rate(s) to the sensors 215(1-n). The sensors 215(1-n) collect data and provide corresponding tool trace data to the sample rate controller 130, which may analyze the tool trace data to determine whether or not one or more faults or unexpected events has taken place. In one embodiment, the sample rate controller 130 may analyze the tool trace data as part of a fault detection and classification scheme.

If the sample rate controller 130 detects a possible fault or other unexpected event, it may be desirable to modify the data collection plan. For example, the temperature in a deposition tool may be controlled to within a preset tolerance of a nominal temperature in order to control a thickness of a deposited layer. The deposition tool may also include a temperature sensor, such as a thermocouple, and a power sensor to monitor the power provided to a heating element in the deposition tool. An unusual level of noise and/or one or more transients in the tool trace data provided by the thermocouple may indicate a process and/or device fault. Thus, it may be desirable to increase the sampling rate of the temperature sensor and/or the power sensor to gather additional data to determine whether or not a process or device fault occurred.

Figure 3A:
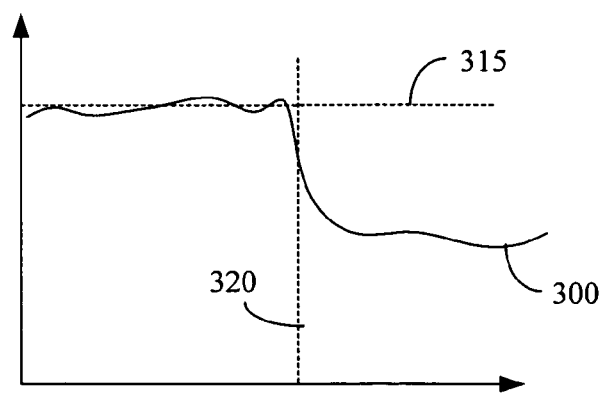
FIGS. 3A, 3B, and 3C conceptually illustrate tool trace data such as may be associated with the processing tool shown in FIG. 2, in accordance with the present invention.
Figure 3B:
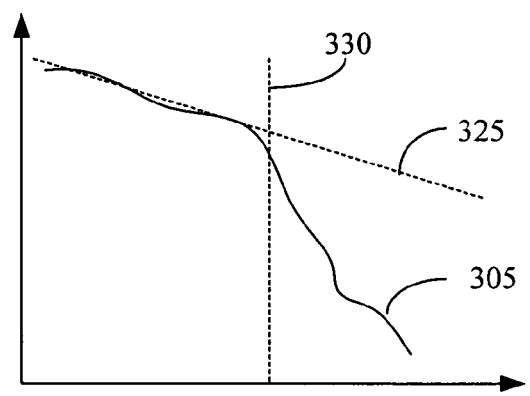
Figure 3C:
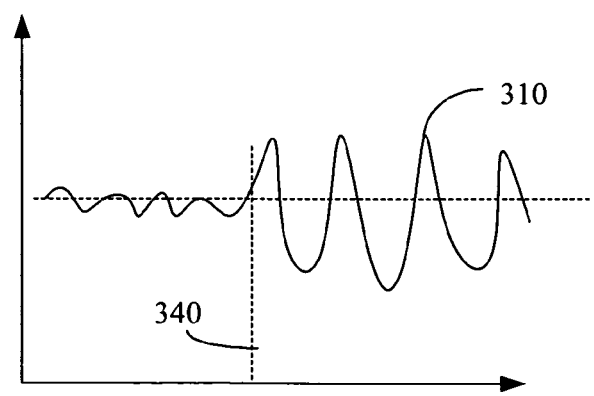

FIGS. 3A, 3B, and 3C conceptually illustrate tool trace data 300, 305, 310 such as may be associated with the processing tool 200 shown in FIG. 2. In the embodiment shown in FIG. 3A, the tool trace data 300 comprises a magnitude that is compared to an expected magnitude 315, which may be determined based upon a reference standard or a portion of the tool trace data 300. An event 320 may then be detected by detecting the difference between the magnitude of the tool trace data 300 and the expected magnitude 315. In the embodiment shown in FIG. 3B, the tool trace data 305 comprises a slope that is compared to an expected slope 325, which may be determined based upon a reference standard or a portion of the tool trace data 305. An event 330 may then be detected by detecting the difference between the slope of the tool trace data 300 and the expected slope 325. In the embodiment shown in FIG. 3C, the tool trace data 310 comprises a noise level that is compared to an expected noise level, which may be determined based upon a reference standard or a portion of the tool trace data 310. An event 340 may then be detected by detecting the change in the noise level in the tool trace data 310. Alternatively, the event 340 may be detected by detecting a change in a signal-to-noise level in the tool trace data 310.

Referring back to FIG. 2, the sample rate controller 130 may modify the data collection plan based upon the tool trace data and the bandwidth of the network 120. For example, the sample rate controller 130 may determine that it is desirable to increase the sample rate of the sensors 215(1-2), so the sample rate controller 130 may modify the data collection plan to indicate the increased sample rate of the sensors 215(1-2). However, as discussed above, the bandwidth of the network 120 is finite and it may not be possible to increase the sampling rate of the sensors 215(1-2), and thereby increase the bandwidth necessary to transmit the too trace data collected by the sensors 215(1-2), without reducing the bandwidth used by, or available to, other sensors. Thus, the sample rate controller 130 may determine that it is desirable to decrease the sample rate of the sensor 215(n) and may modify the data collection plan to indicate the decreased sample rate of the sensor 215(n).

Figure 4:
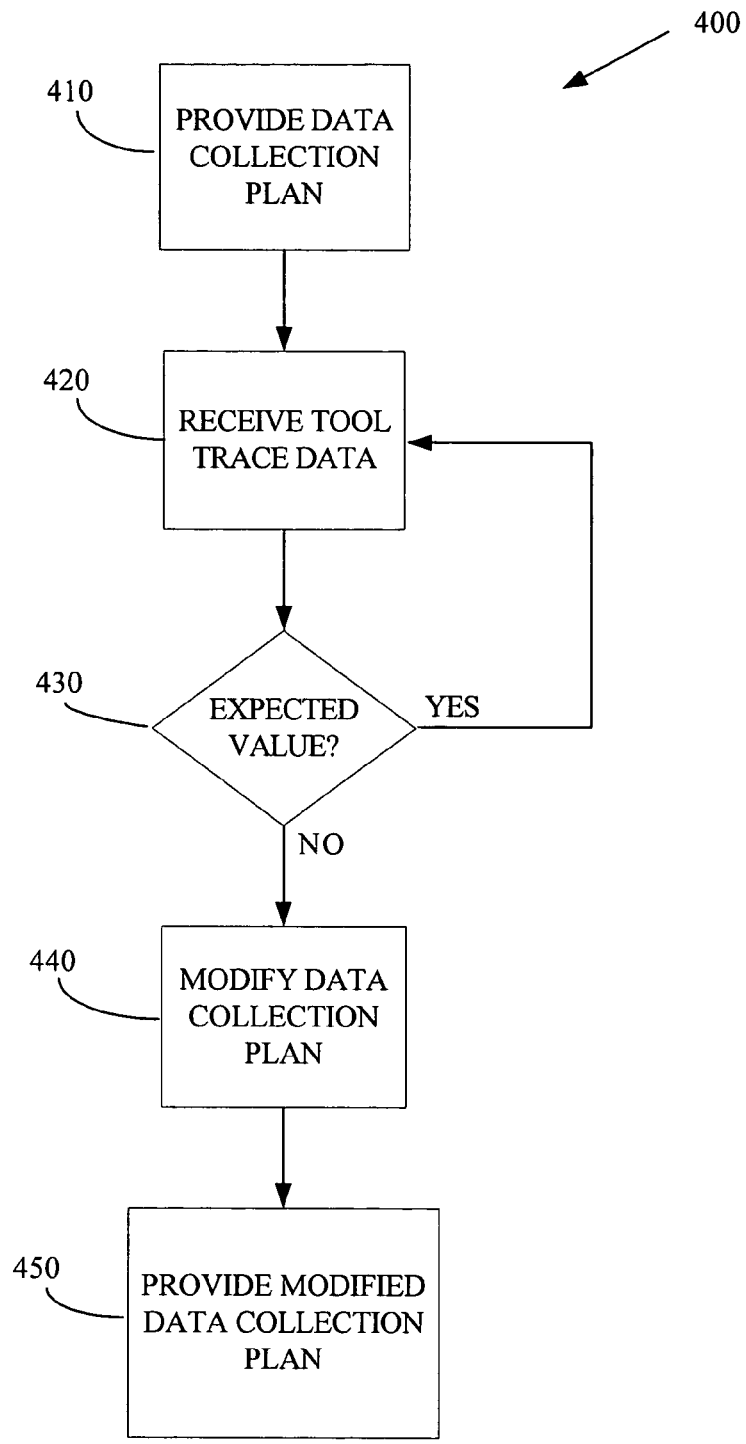
FIG. 4 conceptually illustrates a method of dynamically adjusting a sensor sampling rate that may be used in the manufacturing system shown in FIG. 1, in accordance with the present invention.

FIG. 4 conceptually illustrates a method 400 of dynamically adjusting a sensor sampling rate that may be used in the manufacturing system 10 shown in FIG. 1. In the illustrated embodiment, a controller, such as the sample rate controller 130 shown in FIG. 1, provides (at 410) a data collection plan for one or more sensors associated with one or more processing tools. The provided data collection plan includes information indicative of a nominal sample rate for each of the sensors and may also include other information, such as operating recipes for the one more processing tools. For example, the controller may provide (at 410) the data collection plan to an equipment interface associated with one or more sensors. The one or more sensors collect data in accordance with the provided data collection plan and provide tool trace data, which is received (at 420) by the controller.

As discussed above, the controller then compares (at 430) a value associated with the tool trace data with an expected value. If the value associated with the tool trace data corresponds to the expected value, then the controller may receive (at 420) additional tool trace data. If the value associated with the tool trace data does not correspond to the expected value, then the controller may modify (at 440) the data collection plan. In one embodiment, the controller may modify (at 440) the data collection plan to indicate a new sample rate for one or more of the sensors. The controller then provides (at 450) the modified data collection plan to one or more of the sensors. In one embodiment, the controller provides (at 450) the modified data collection plan during a process run. In another embodiment, the controller provides (at 450) the modified data collection plan between two process runs.

By implementing one or more embodiments of the present invention, the ability of the APC system to detect and/or classify faults or other unexpected events associated with the processing tools may be enhanced. For example, the APC system may be able to increase the sampling rate of select sensors that are relevant to the suspected fault or unexpected event to provide additional data that may assist in detecting and/or classifying the suspected fault or unexpected event. The APC system may also be able to reduce the sampling rate of select sensors that are not as relevant to the suspected fault or unexpected event, thereby increasing the available network bandwidth, which may be advantageous when transmitting the additional data collected by the sensors that are operating at a higher sampling rate.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   providing a data collection plan indicative of a plurality of first sampling rates for a corresponding plurality of sensors associated with at least one processing tool;
   receiving tool trace data from the plurality of sensors via a network; and
   modifying, based on the tool trace data and a network bandwidth, the data collection plan to indicate an increase in a first portion of the plurality of first sampling rates to at least one second sampling rate that is higher than the corresponding first sampling rate, the data collection plan being modified such that a bandwidth used to transmit the tool trace data collected at the plurality of second sampling rates is less than the network bandwidth.

2. The method of claim 1, wherein modifying the data collection plan to indicate the at least one second sampling rate comprises modifying the data collection plan to indicate a plurality of second sampling rates to be used by a plurality of sensors.

3. The method of claim 1, further comprising determining the bandwidth associated with the network.

4. The method of claim 3, wherein determining the bandwidth associated with the network comprises determining the bandwidth associated with the network based on at least one of a predetermined bandwidth and data received from the network.

5. A method, comprising:
   providing a data collection plan indicative of at least one first sampling rate for at least one sensor associated with at least one processing tool, wherein providing the data collection plan indicative of at least one first sampling rate for at least one sensor comprises providing a data collection plan indicative of a plurality of first sampling rates for a corresponding plurality of sensors;
   receiving tool trace data from the at least one sensor via a network; and
   modifying, based on the tool trace data and a bandwidth associated with the network, the data collection plan to indicate at least one second sampling rate different from a corresponding at least one first sampling rate, wherein modifying the data collection plan to indicate the at least one second sampling rate comprises modifying the data collection plan to indicate a plurality of second sampling rates to be used by a plurality of sensors, and wherein modifying the data collection plan to indicate the plurality of second sampling rates comprises modifying the data collection plan to indicate that a first portion of the plurality of second sampling rates are higher than the corresponding first sampling rates, the first portion of the plurality of second sampling rates being increased in response to detecting at least one fault or unexpected event.

6. The method of claim 5, wherein modifying the data collection plan to indicate the plurality of second sampling rates comprises modifying the data collection plan to indicate that a second portion of the plurality of second sampling rates are lower than the corresponding first sampling rates, the second portion of the plurality of second sampling rates being decreased in response to increasing the first portion of the second sampling rates to maintain a bandwidth used to transmit tool trace data from the sensors.

7. The method of claim 1, wherein modifying the data collection plan based on the tool trace data comprises determining that a value associated with the tool trace data is different than an expected value.

8. The method of claim 1, further comprising providing the modified data collection plan for the at least one sensor.

9. The method of claim 8, wherein providing the modified data collection plan for the at least one sensor comprises providing the modified data collection plan for the at least one sensor during a process run.

10. The method of claim 8, wherein providing the modified data collection plan for the at least one sensor comprises providing the modified data collection plan for the at least one sensor between two process runs.

11. A manufacturing system, comprising:
means for providing a data collection plan indicative of a plurality of first sampling rates for a corresponding plurality of sensors associated with at least one processing tool;
means for receiving tool trace data from the plurality of sensors via a network; and
means for modifying, based on the tool trace data and a network bandwidth, the data collection plan to indicate an increase in a first portion of the plurality of first sampling rates to at least one second sampling rate that is higher than the corresponding first sampling rate, the data collection plan being modified such that a bandwidth used to transmit the tool trace data collected at the plurality of second sampling rates is less than the network bandwidth.

12. A manufacturing system, comprising:
a network having a bandwidth;
at least one sensor coupled to the network, the sensor configured to provide tool trace data associated with a processing tool via the network;
a controller configured to:
provide a data collection plan indicative of a plurality of first sample rates for the at least one sensor;
receive the tool trace data; and
modify, based upon the tool trace data and the bandwidth, the data collection plan to indicate an increase in a first portion of the plurality of first sampling rates to at least one second sample rate that is higher than a corresponding first sample rate, the data collection plan being modified such that a bandwidth used to transmit the tool trace data collected at the plurality of second sampling rates is less than the network bandwidth.

13. The system of claim 12, wherein the at least one sensor comprises a plurality of sensors coupled to the network.

14. The system of claim 13, comprising a plurality of sensors, wherein the controller is configured to modify the data collection plan to increase the first portion of the plurality of first sampling rates to a corresponding plurality of second sampling rates to be used by the sensors.

15. The system of claim 12, wherein the controller is configured to determine that a value associated with the tool trace data is different than an expected value.

16. The system of claim 15, wherein the controller is configured to modify the data collection planned in response to determining that the value associated with the tool trace data is different than the expected value.

17. The system of claim 15, wherein the value associated with the tool trace data is at least one of a trace slope, a magnitude, a noise level, a transient level, and a signal-to-noise ratio, and wherein the expected value is at least one of a reference standard, a trace slope, a magnitude, a noise level, and a signal-to-noise ratio.

18. The system of claim 12, wherein the controller is configured to provide the modified data collection plan for the at least one sensor.

19. The system of claim 18, wherein the controller is configured to provide the modified data collection plan for the at least one sensor during a process run.

20. The system of claim 18, wherein the controller is configured to provide the modified data collection plan for the at least one sensor between two process runs.

21. The system of claim 12, wherein the controller is configured to determine the bandwidth associated with the network.

22. The system of claim 21, wherein the controller is configured to determine the bandwidth associated with the network based on at least one of a predetermined bandwidth and data received from the network.

23. A manufacturing system, comprising:
a network having a bandwidth;
a plurality of sensors coupled to the network, the sensor configured to provide tool trace data associated with a processing tool via the network;
a controller configured to:
provide a data collection plan indicative of at least one first sample rate for the at least one sensor;
receive the tool trace data; and
modify, based upon the tool trace data and the bandwidth, the data collection plan to indicate at least one second sample rate different from a corresponding at least one first sample rate, wherein the controller is configured to modify the data collection plan to indicate a plurality of second sampling rates to be used by the sensors, and wherein the controller is configured to modify the data collection plan to indicate that a first portion of the plurality of second sampling rates are higher than the corresponding first sampling rates, the first portion of the plurality of second sampling rates being increased in response to detecting at least one fault or unexpected event.

24. The system of claim 23, wherein the controller is configured to modify the data collection plan to indicate that a second portion of the plurality of second sampling rates are lower than the corresponding first sampling rates, the second portion of the plurality of second sampling rates being decreased in response to increasing the first portion of the second sampling rates to maintain a bandwidth used to transmit tool trace data from the sensors.

* * * * *